June 6, 1961 J. A. HANNA Re. 24,997

METHOD OF ERECTING FLOATING ROOFS

Original Filed Oct. 21, 1953 2 Sheets-Sheet 1

INVENTOR.
James A. Hanna,
BY George J. Haight +
George H. Simmons
Attys.

June 6, 1961 J. A. HANNA Re. 24,997

METHOD OF ERECTING FLOATING ROOFS

Original Filed Oct. 21, 1953 2 Sheets-Sheet 2

INVENTOR.
James A. Hanna,
BY George D. Haight +
George H. Simmons
Atty

United States Patent Office

Re. 24,997
Reissued June 6, 1961

24,997

METHOD OF ERECTING FLOATING ROOFS

James A. Hanna, Highland Park, Ill., assignor to General American Transportation Corporation, Chicago, Ill., a corporation of New York Original No. 2,848,799, dated Aug. 26, 1958, Ser. No. 387,460, Oct. 21, 1953. Application for reissue Apr. 22, 1959, Ser. No. 808,289

5 Claims. (Cl. 29—429)

Matter enclosed in heavy brackets [ ] appears in the original patent but forms no part of this reissue specification; matter printed in italics indicates the additions made by reissue.

This invention relates to the erection of floating roofs in cylindrical storage tanks and has for its principal object the provision of a new and improved method of erecting such structures.

It is a main object of the invention to provide a method of erecting and installing a floating roof in a storage tank, which requires the use of a minimum of temporary structure.

Another object of the invention is to provide a method of erecting and installing a floating roof in a storage tank with a minimum expense.

Further objects of the invention not specifically mentioned here will be apparent from the detailed decsription and claims which follow, reference being had to the accompanying drawings in which the invention is diagrammatically illustrated in connection with one type of floating roof and in which:

Figure 1:
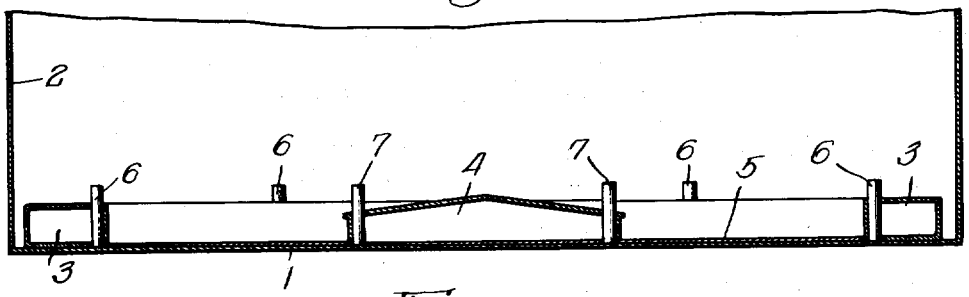
FIG. 1 is a diagrammatic view showing the first step of the process.

Storage tanks, such as are commonly used to store volatile liquids, frequently are in the form of a cylindrical tank, the axis of which is disposed vertically. Such tanks are oftentimes equipped with roofs which float upon the surface of the liquid stored in the tank, and rise and fall therein as the liquid level changes. Such roofs are provided in a number of forms including so-called high deck roofs in which the deck registers with the top of a continuous peripheral pontoon; low deck roofs in which the deck registers substantially with the bottom of a continuous peripheral pontoon; double deck roofs in which the decks register substantially with both the top and bottom of a continuous peripheral pontoon; and pan type roofs consisting of a deck and peripheral upwardly extending wall. Roofs for large diameter tanks are usually provided with a center pontoon in addition to the peripheral pontoon.

In the erection of such tanks it has heretofore been the procedure to lay the bottom of the tank complete and to erect the first layer of the side wall of the tank complete. Temporary structures are then placed upon the bottom comprising, in effect, a skeleton false bottom disposed above the bottom of the tank a distance corresponding to the normal minimum working height of the roof. The roof structure is then erected upon this false work. It will be understood that the deck and pontoons, if any, are both constructed of steel plates that are lapped and welded together. Construction of the roof elevated off of the bottom is necessary to permit installation of underdeck devices such as drains.

It is common practice in floating roofs of this type to provide as [integral] *integral* components of the roof, a plurality of sleeves through which are projected supporting pipes that engage the bottom of the tank and limit the downward movement of the roof at a point a few feet above the bottom. The supporting pipes ordinarily extend several feet above the roof, and when it is necessary to clean the tank or repair the same, these pipe supports are projected farther down while the roof is still floating upon the liquid, so that they will engage the bottom of the tank and support the roof thereabove a distance sufficient to permit the workmen to perform their duties in the space between the roof and the bottom of the tank after the tank has been drained.

Heretofore, as soon as the drains, sleeves, and supporting pipes have been inserted in the completed roof structure with the supports engaging the bottom of the tank, the false work has been removed. Since the roof structure must be complete or virtually complete before the false work can be removed, it is obvious that the task of removing this false work is hand work and therefore quite expensive, constituting a disproportionately large portion of the cost of installing the roof. Furthermore, since the entire roof, including the pontoons if any, must be supported in elevated position, a large quantity of false work material is required and the transportation of such material from job to job is therefore quite expensive.

The present method modifies the procedure that has been followed heretofore, in such a manner as to eliminate or minimize the use of false or temporary work and, where temporary work is employed in reduced amount, to employ it in such position as to enable it to be handled into and out of the tank more economically than has been possible heretofore.

To this end the procedure of laying the bottom of the tank is followed as before. The roof structure is then erected directly upon the bottom of the tank. In case the roof is of the type having pontoons and a deck, both the pontoons and the deck are erected directly upon the bottom of the tank and the sleeves are installed and secured in place as by welding. In roofs such as the pan type roof, the deck and peripheral wall are erected upon the bottom of the tank and the sleeves installed therein.

Supporting pipes are inserted in the sleeves and the thus completed roof then hosited into working position by hoisting means secured to the supporting pipes and to the roof. With the roof thus elevated, underdeck devices, such as drains, are then installed to complete the structure.

In the case of a so-called high deck roof, either one of two procedures may be followed within the teachings of the invention. In either case, the outer pontoon that extends completely around the periphery of the roof is erected directly upon the bottom and equipped with sleeves. In the case of large diameter tanks the center pontoon is also erected directly upon the bottom at the center of the tank. Either one of two procedures may then be followed in erecting the deck. In the one instance, the deck plates are installed directly on the bottom subsequently to be hosited into registration with the pontoons by hoisting means attached to the supporting pipes that are placed in the sleeves. In the other procedure, a small amount of false work is placed upon the bottom of the tank and the plates laid thereupon and secured together and to the pontoons, the false work being moved around the deck as the work proceeds. In either case, the deck and pontoons are raised off of the bottom of the tank by hoisting means connected between the supporting pipes and the roof structure. When the roof is thus elevated, it is secured to the supporting pipes and underdeck devices, such as drains, are next installed. After the roof is secured to the supporting pipes, any false work that has been employed can be removed easily since the side walls of the tank have not yet been erected and the false work can be moved laterally off of the bottom.

In the case of a low deck roof, the pontoons are installed as before and the deck plates placed either upon the bottom or upon false work that raises the outer ends of the plate to provide pitch to the roof for drainage purposes. Sleeves are installed and the roof hoisted to working height as before, after which underdeck devices, such as drains, may be installed.

As will be seen in FIG. 1, in the first step of my improved process, the bottom 1, outer pontoon 3, central pontoon 4, if the tank is of large diameter and the roof is to be equipped with a central pontoon, and the deck 5, are erected with the pontoons and deck disposed upon the bottom 1 of the tank. This step of the operation includes inserting in the pontoons sleeves 6 and 7 which are usually located at the inner edge of the outer pontoon and outer edge of the inner pontoon and are sufficient in number to permit proper control of the roof in operation.

In FIG. 1 and throughout the drawings, the outer wall 2 of the tank is shown merely to illustrate its position relative to the roof as, in accordance with the teachings of this invention, the outer wall of the tank is not erected until after the roof is completed.

Figure 3:
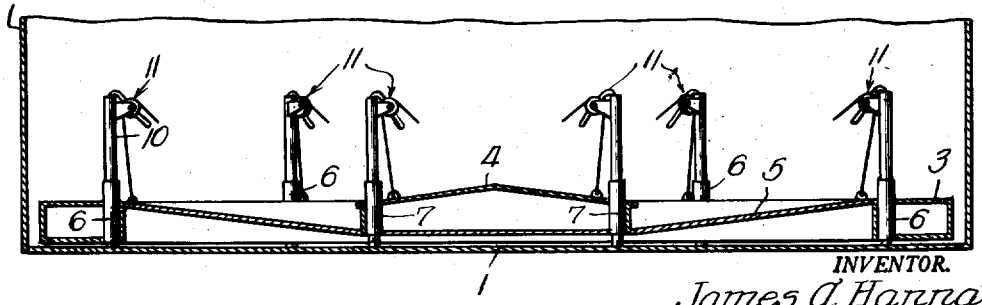
FIG. 3 is an elevational view showing the next step of the process.
Figure 6:
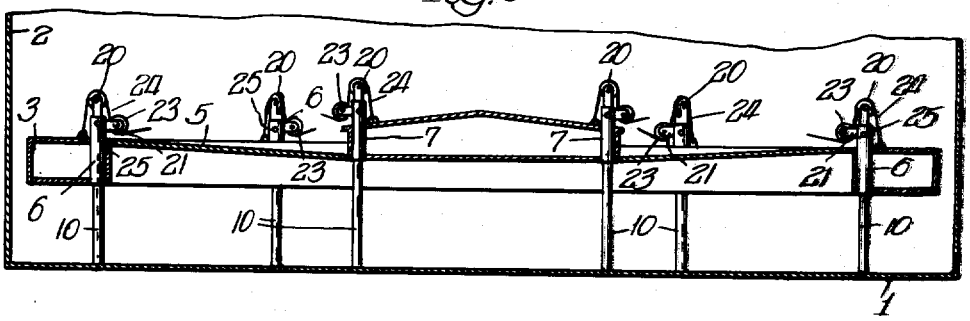
FIG. 6 is a diagrammatic view illustrating the structure at the completion of the process.
Figure 4:
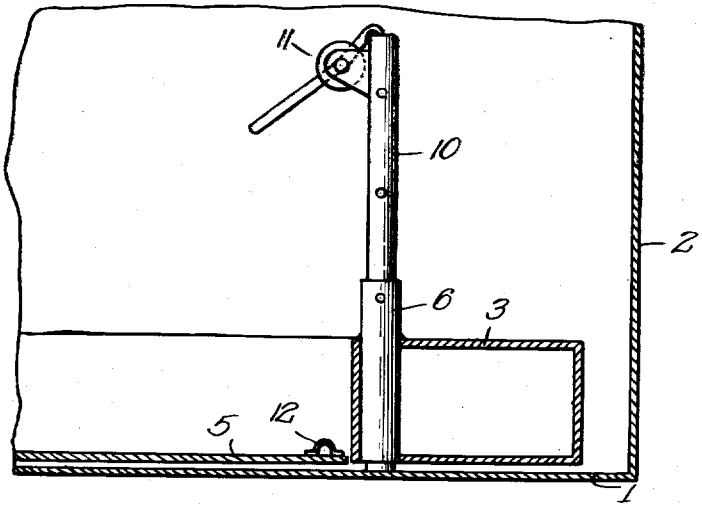
FIG. 4 is a detailed view drawn to an enlarged scale and showing the arrangement employed in the step of the process illustrated in Fig 3.
Figure 5:
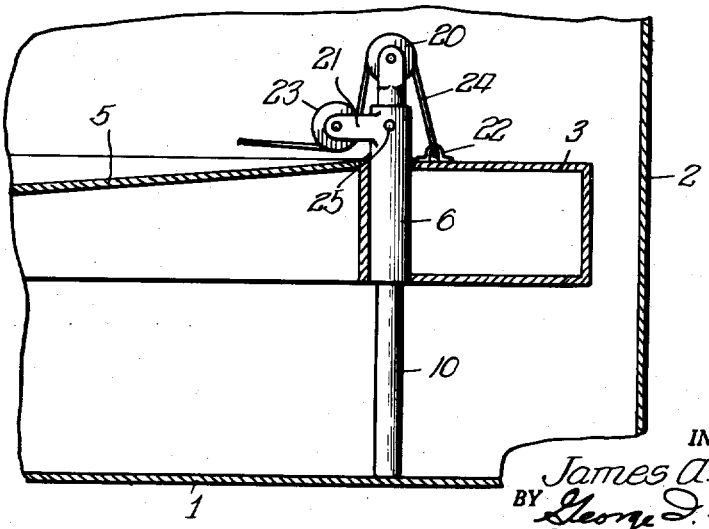
FIG. 5 is a detailed view drawn to an enlarged scale showing the arrangement of apparatus employed in the next step of the process.

As will be seen in FIG. 4, a pipe support 10 is projected through each of the sleeves 6 and 7 and a hoisting mechanism 11, preferably consisting of a chain hoist, is connected between the top of the supports 10 and brackets 12 attached to the deck 5 adjacent the outer edge thereof. Operation of the hoist 11 raises the deck into the position in which it is shown in FIG. 3.

Since the deck at this stage is unsupported at its outer edge, no temporary supporting structure having been used, it may be badly distorted by being raised to the position shown in FIG. 3. To guard against such a contingency, temporary brace members 15, preferably composed of scaffolding timbers, may be laid over the upper surface of the deck in such a pattern as will best prevent distortion of it, which pattern may be varied within the teachings of the invention and will depend upon such factors as the diameter of the deck and height to which the outer edge is to be raised. The timbers 15 are secured to the deck by suitable brackets 16 welded to the deck plates.

In certain instances with very large decks, it may be advantageous to clamp one of the radial seams in the deck plates instead of welding it, until after the deck has been hoisted to final position relative to the pontoons to permit a sliding movement of the plates during hoisting; however, I have found that ordinarily such procedure is not required if proper arrangements for stiffening the deck structure are employed.

With the deck 5 elevated in the manner shown in FIG. 3, with its outer periphery in registration with the upper edge of the pontoon, the deck is secured to the pontoon usually by welding. The hoists are then removed and preparations made to raise the roof to working position.

If desired, the deck plates may be erected on false work which positions the plates in proper registration with the pontoons to which they are then secured. The false work is moved around the deck as the work proceeds and hoisting of the deck off of the bottom is not necessary.

Figure 2:
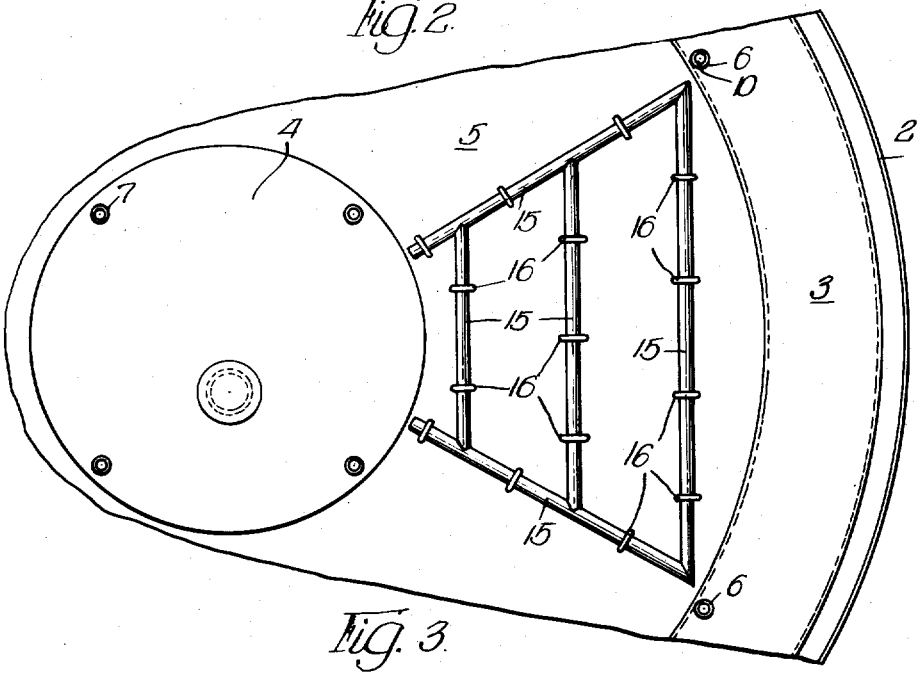
FIG. 2 is a plan view showing the second step of the process.

In the case of a low deck roof, the procedure illustrated in FIGS. 2, 3 and 4 may be omitted and the deck secured to the pontoons while on the bottom of the tank, as shown in FIG. 1. If desired, the pontoons may be raised a few inches off of the bottom prior to attachment of the deck thereto so as to provide drainage pitch in the deck.

As will be readily understood by those skilled in the art, hoisting means such as 11, FIG. 4, if employed to raise the roof on the supporting pipes 10, would put a side [trust] *thrust* on the pipes causing them to bind badly in the sleeves 6. Preferably, therefore, each of the pipes 10 is equipped with a sheave 20, and brackets 21 and 22 are fixed to the groove adjacent the sleeve 6. Bracket 21 carries a pulley 23 and a cable 24 is attached to the bracket 22, extended over the sheave 20 down the other side of the pipe 10 to the pulley 23 and thence to a hoisting device such as a chain hoist, of sufficient capacity to enable the roof to be raised.

When each of the pipes 10 has been so equipped, the hoisting devices are operated to raise the roof to a desired height off of the bottom, and the pipes 10 are secured to the sleeve 6 in any preferred manner, such as for example by bolts extending through perforations 25 in the sleeve and pipe thus brought into registration with each other. The roof is then supported above the bottom of the tank by the pipes 10 and the hoisting devices can be removed and the roof completed by the addition of sealing devices, vents, underdeck drain pipes, and the like. After these devices have been added, the tank may be completed by erecting the walls in the usual manner.

Thus it will be seen that the process of the present invention simplifies the installation and construction of a floating roof in a storage tank by considerable reduction or elimination of temporary structure used for supporting the roof in working position during such construction. A minimum of apparatus is required, the overall cost and materials are less, and part of the permanent roof structure is utilized to accomplish these purposes.

While I have chosen to illustrate my invention by showing and describing a preferred embodiment of it, I have done so by way of example as there are many modifications and adaptations which can be made by one skilled in the art, to meet varying conditions encountered, within the teachings of the invention.

Having thus complied with the statutes and shown and described a preferred embodiment of my invention, what I consider new and desire to have protected by Letters Patent is pointed out in the appended claims.

What is claimed is:

1. The method of erecting a pontoon supported floating roof for a cylindrical tank, which roof has a continuous peripheral pontoon, a center pontoon and a single deck extending between said pontoons, which comprises: constructing the bottom of the tank; constructing the pontoons and deck upon the bottom; installing vertical sleeves at spaced apart points through and near the inner periphery of the peripheral pontoon and through and near the outer periphery of the center pontoon; projecting supporting pipes of greater length than the sleeves through said sleeves into engagement with the bottom; attaching a hoisting device between each pipe and the deck; operating said hoisting devices to raise the deck into desired registration with the pontoons; welding the deck to the pontoons; operating said hoisting devices to raise the roof on said pipes into working position; fastening the sleeves to the pipes to secure the roof in working position; and completing the thus secured roof.

2. The method of erecting and installing a roof that floats upon the liquid in a cylindrical storage tank, which comprises: constructing the bottom of the tank; erecting the basic structure of the roof on said bottom with a plurality of vertical sleeves extending therethrough at spaced apart points in the roof; then projecting through each sleeve a pipe that engages said bottom and extends above the sleeve and roof; then attaching a hoisting device between the top of each pipe and the roof; operating said hoisting devices to raise the roof on the pipes into a working position above said bottom; securing said roof in said working position by attaching it to said pipes; removing said hoisting devices; and while the roof is thus secured in said working position, attaching to it the devices required beneath and on the underside of it, thereby to complete the erection and installation of [the] *said roof in its low service position and prior to the construction of the cylindrical side of the tank upwardly from said bottom and to a height well above the low service position of said* roof.

*3. The method of erecting and installing a floating roof in a substantially cylindrical field storage tank, which comprises: constructing the bottom of the tank; erecting the roof on said bottom; inserting a plurality of supporting posts through a plurality of openings provided in said roof and extending downwardly therethrough into engagement with said bottom; raising said roof on said posts to a low service position disposed above said bottom by applying a plurality of lifting forces between said posts and a plurality of points on said roof; securing said roof to said posts in said low service position; completing said roof in said low service position and prior to the construction of the cylindrical side of the tank upwardly from said bottom and to a height well above said low service position of said roof; and thereafter constructing the cylindrical side of the tank upwardly from said bottom to a height well above said low service position of said roof.*

*4. The method of erecting and installing a floating roof in a substantially cylindrical field storage tank, which comprises: constructing the bottom of the tank; erecting the roof on said bottom; installing a plurality of vertical sleeves in a plurality of openings provided in said roof; inserting a plurality of supporting posts through said sleeves and extending downwardly therethrough into engagement with said bottom and extending upwardly therethrough above said sleeves and above said roof; raising said roof on said posts to a low service position disposed above said bottom by applying a plurality of lifting forces between said posts and a plurality of points on said roof; securing said sleeves to said posts in said low service position; completing said roof in said low service position and prior to the construction of the cylindrical side of the tank upwardly from said bottom and to a height well above said low service position of said roof; and thereafter constructing the cylindrical side of the tank upwardly from said bottom to a height well above said low service position of said roof.*

*5. The method of erecting and installing a floating roof in a substantially cylindrical field storage tank, which comprises: constructing the bottom of the tank; erecting the roof on said bottom; inserting a plurality of supporting posts through a plurality of openings provided in said roof and extending downwardly therethrough into engagement with said bottom and extending upwardly therethrough above said roof; providing a plurality of hoisting attachments between the upper ends of said posts and a plurality of points on said roof; exerting a plurality of lifting forces via said hoisting attachments between the upper ends of said posts and said points on said roof, so as to raise said roof on said posts to a low service position disposed above said bottom; securing said roof to said posts in said low service position; completing said roof in said low service position and prior to the construction of the cylindrical side of the tank upwardly from said bottom to a height well above said low service position of said roof; and thereafter constructing the cylindrical side of the tank upwardly from said bottom to a height well above said low service position of said roof.*

References Cited in the file of this patent or the original patent

UNITED STATES PATENTS

| | | |
|---|---|---|
| 2,221,133 | Gladuille | Nov. 12, 194 |
| 2,304,354 | Harvey | Dec. 8, 194 |
| 2,403,604 | Laird | July 9, 194 |
| 2,554,768 | Allen | May 29, 195 |
| 2,586,856 | Orr et al. | Feb. 26, 195 |
| 2,746,137 | Wiggins | May 22, 195 |

FOREIGN PATENTS

| | | |
|---|---|---|
| 600,129 | Great Britain | Apr. 1, 194 |